United States Patent
Guo et al.

(10) Patent No.: US 12,401,197 B1
(45) Date of Patent: Aug. 26, 2025

(54) FREQUENCY MODULATION METHOD AND SYSTEM FOR THERMAL POWER UNIT COUPLED WITH MOLTEN SALT ENERGY STORAGE

(71) Applicant: JINING HUAYUAN HEAT POWER CO., LTD., Jining (CN)

(72) Inventors: Renlong Guo, Jining (CN); Xiugang Shi, Jining (CN); Zenggang Yue, Jining (CN); Wei Wang, Jining (CN); Chenghui Ma, Jining (CN); Zhipeng Li, Jining (CN); Huawei Wang, Jining (CN); Lisong Zhang, Jining (CN)

(73) Assignee: JINING HUAYUAN HEAT POWER CO., LTD., Jining (CN)

( * ) Notice: Subject to any disclaimer, the term of this patent is extended or adjusted under 35 U.S.C. 154(b) by 0 days.

(21) Appl. No.: 19/208,970

(22) Filed: May 15, 2025

Related U.S. Application Data

(63) Continuation of application No. PCT/CN2025/084713, filed on Mar. 25, 2025.

(51) Int. Cl.
*H02J 3/24* (2006.01)
*H02J 3/28* (2006.01)
*H02J 3/46* (2006.01)

(52) U.S. Cl.
CPC ............... *H02J 3/241* (2020.01); *H02J 3/28* (2013.01); *H02J 3/466* (2020.01); *H02J 2203/20* (2020.01)

(58) Field of Classification Search
CPC .... H02J 2203/20; H02J 2203/10; H02J 3/241; H02J 3/24; H02J 3/28; H02J 3/466;
(Continued)

(56) References Cited

U.S. PATENT DOCUMENTS

| 11,955,837 B2 * | 4/2024 | Huber .................. H02J 3/381 |
| 2019/0157872 A1 * | 5/2019 | Taimela ............... H02J 3/381 |
| 2023/0076681 A1 * | 3/2023 | Hyland ................ G05B 15/02 |

FOREIGN PATENT DOCUMENTS

| CN | 2021056727 A1 | 4/2021 |
| CN | 117674198 A | 3/2024 |

(Continued)

OTHER PUBLICATIONS

Li Weiguo, Jiao Panlong, Liu Xinyu, Xu Bei, Capacity optimization configuration of energy storage auxiliary traditional unit frequency modulation based on variational mode decomposition, Journal, Mar. 16, 2020, vol. 48 No. 6, Power System Protection and Control, China.

(Continued)

*Primary Examiner* — Nguyen Tran
(74) *Attorney, Agent, or Firm* — Ming Jiang; OPENPTO US LLC

(57) ABSTRACT

A frequency modulation method and system for a thermal power unit coupled with molten salt energy storage are provided. The method includes: decomposing the power grid frequency modulation response demand by VMD algorithm to obtain residual components and a plurality of modal components; calculating adjacent aliasing degrees of all the modal components, and dividing a high frequency modal component group and a low frequency modal component group based on an adjacent aliasing degree minimum value; if the high frequency modal component group only includes one modal component, equally dividing the residual components and the plurality of modal components into a high frequency group and a low frequency group according to central frequencies, and performing a plurality of fusion methods on modal components in the high frequency group to obtain different fused components.

9 Claims, 4 Drawing Sheets

(58) Field of Classification Search
CPC ...... H02J 3/472; H02J 3/44; H02J 3/46; H02J 3/38; H02J 3/2826; H02J 3/30; H02J 3/32; H02J 3/34; H02J 3/36
See application file for complete search history.

(56) References Cited

FOREIGN PATENT DOCUMENTS

| | | |
|---|---|---|
| CN | 117674199 A | 3/2024 |
| CN | 117691629 A | 3/2024 |
| CN | 117713144 A | 3/2024 |

OTHER PUBLICATIONS

Cai Tingting, Xue Wendong, Optimal Configuration of Hybrid Energy Storage System for Primary Frequency Regulation Based on VMD, Journal, Feb. 2024, vol. 44, No. 1, Journal of Northeast Electric Power University, China.

Li Huik, Bearing fault diagnosis based on variational mode decomposition and time frequency plot, Journal, Sep. 2020, vol. 30 No. 3, Journal of Tianjin University of Technology and Education, China.

\* cited by examiner a frequency modulation system for a thermal power unit coupled with molten salt energy storage obtaining module 11 decomposition module 12 calculation module 13 fusion module 14 selection module 15 dividing module 16 control module 17

FIG. 4

FREQUENCY MODULATION METHOD AND SYSTEM FOR THERMAL POWER UNIT COUPLED WITH MOLTEN SALT ENERGY STORAGE

CROSS-REFERENCE TO RELATED APPLICATIONS

This application is a continuation of PCT/CN2025/084713, filed on Mar. 25, 2025 and claims priority of Chinese Patent Application No. 202410345140.6, filed on Mar. 25, 2024, the contents of which are hereby incorporated by reference.

TECHNICAL FIELD

The disclosure relates to the technical field of power grid frequency modulation, in particular to a frequency modulation method and system for a thermal power unit coupled with molten salt energy storage.

BACKGROUND

The fire-storage combined frequency modulation can significantly improve the frequency modulation performance of thermal power units, and can quickly and effectively reduce the frequency modulation capacity shortage of the system. At present, the fire-storage combined frequency technology includes battery energy storage, supercapacitor energy storage, flywheel energy storage, molten salt energy storage and mixed energy storage in various forms, etc. The cycle life of fire battery energy storage is short, and there are certain security risks. Supercapacitor energy storage and flywheel energy storage, as representatives of power energy storage devices, have the disadvantages of high cost and low energy density. Molten salt energy storage uses nitrate and other raw materials as heat storage media, and stores and releases energy through the conversion of heat energy of heat transfer working medium and internal energy of molten salt, which has the advantages of low cost, high safety, large capacity and long life.

In the prior art, the molten salt energy storage combined with variational mode decomposition (VMD) technology is used to assist frequency modulation. However, when the frequency division point is located in the last sequence, VMD decomposition will cause the unit to undertake too many tasks, which will increase the wear degree, affect the service life, and can not give full play to the performance of molten salt energy storage.

SUMMARY

The disclosure aims at solving one of the technical problems in the related art at least to some extent.

For this reason, the first purpose of the disclosure is to provide a frequency modulation method for a thermal power unit coupled with molten salt energy storage, so as to reduce the impact on the service life of the unit.

The second purpose of the disclosure is to provide a frequency modulation system of a thermal power unit coupled with molten salt energy storage.

A third object of the disclosure is to provide an electronic device.

A fourth object of the disclosure is to provide a computer-readable storage medium.

In order to achieve the above purpose, the first embodiment of the disclosure provides a frequency modulation method for a thermal power unit coupled with molten salt energy storage, thermal power plant is equipped with a molten salt energy storage device, and the frequency modulation method includes the following steps:

determining power grid frequency modulation response demand based on received frequency modulation instruction;

decomposing the power grid frequency modulation response demand by VMD algorithm based on a decomposition layer number to obtain residual components and a plurality of modal components;

calculating adjacent aliasing degrees of all the modal components, and dividing a high frequency modal component group and a low frequency modal component group based on an adjacent aliasing degree minimum value;

if the high frequency modal component group only includes one modal component, equally dividing the residual components and the plurality of modal components into a high frequency group and a low frequency group according to central frequencies, and performing a plurality of fusion methods on modal components in the high frequency group to obtain different fused components;

calculating ratios of each of the fusion components to the power grid frequency modulation response demand, screening a target ratio group of being larger than a set ratio from all the ratios, and selecting fusion components corresponding to a minimum frequency division point as target fusion components based on frequency division points of each of the fusion components corresponding to the target ratio group;

where modal components in the high frequency group corresponding to the target fusion components constitute high frequency components, and the low frequency group and remaining modal components in the high frequency group constitute low frequency components;

controlling the molten salt energy storage device to respond according to the high frequency components and controlling thermal power unit to respond according to the low frequency components.

In the method of the first aspect of the disclosure, equally dividing the residual components and the plurality of modal components into a high frequency group and a low frequency group includes: if a component total number of the residual component and the plurality of modal components is even, a modal component number of the high frequency group is equal to half of the component total number; if the component total number of the residual components and the plurality of modal components is odd, the modal component number of the high frequency group is equal to half of the component total number and then rounded up.

In the method of the first aspect of the disclosure, performing a plurality of fusion methods on modal components in the high frequency group to obtain different fused components includes: arranging the modal components in the high frequency group according to the central frequencies from small to large; starting each of the fusion methods with modal components corresponding to a maximum central frequency, and selecting a plurality of modal components of being continuous for fusion to obtain fusion components under a corresponding fusion method, where a modal component number fused by different fusion methods is different.

In the method of the first aspect of the disclosure, each of the fusion components includes a set number of sub-fusion components, and the power grid frequency modulation response demand includes a set number of response demand values, calculating ratios of each of the fusion components to the power grid frequency modulation response demand includes: for each of the fusion components, calculating corresponding fusion component average values based on a set number of sub-fusion components of the fusion component;

calculating a response demand average value based on a set number of response demand values of the power grid frequency modulation response demand; calculating the ratios of each of the fusion component to the power grid frequency modulation response demand by using each of the fusion component average values and the response demand average value.

In order to achieve the above purpose, the second embodiment of the disclosure provides a frequency modulation system for a thermal power unit coupled with molten salt energy storage, where a thermal power plant is equipped with a molten salt energy storage device, and the frequency modulation system includes:

- an obtaining module, used for determining power grid frequency modulation response demand based on received frequency modulation instruction;
- a decomposition module, used for decomposing the power grid frequency modulation response demand by VMD algorithm based on a decomposition layer number to obtain residual components and a plurality of modal components;
- a calculation module, used for calculating adjacent aliasing degrees of all the modal components, and dividing a high frequency modal component group and a low frequency modal component group based on an adjacent aliasing degree minimum value;
- a fusion module, used for equally dividing the residual components and the plurality of modal components into a high frequency group and a low frequency group according to central frequencies if the high frequency modal component group only includes one modal component, and performing a plurality of fusion methods on modal components in the high frequency group to obtain different fused components;
- a selection module, used for calculating ratios of each of the fusion components to the power grid frequency modulation response demand, screening a target ratio group of being larger than a set ratio from all the ratios, and selecting fusion components corresponding to a minimum frequency division point as target fusion components based on frequency division points of each of the fusion components corresponding to the target ratio group;
- a dividing module, used for constituting high frequency components from modal components in the high frequency group corresponding to the target fusion components, constituting low frequency components from the low frequency group and remaining modal components in the high frequency group;
- a control module, used for controlling the molten salt energy storage device to respond according to the high frequency components and controlling thermal power unit to respond according to the low frequency components.

In the system of the second aspect of the disclosure, in the fusion module, equally dividing the residual components and the plurality of modal components into a high frequency group and a low frequency group includes: if a component total number of the residual component and the plurality of modal components is even, a modal component number of the high frequency group is equal to half of the component total number; if the component total number of the residual components and the plurality of modal components is odd, the modal component number of the high frequency group is equal to half of the component total number and then rounded up.

In the system of the second aspect of the disclosure, in the fusion module, performing a plurality of fusion methods on modal components in the high frequency group to obtain different fused components includes: the modal components in the high frequency group are arranged according to the central frequencies from small to large; each of the fusion methods is started with modal components corresponding to a maximum central frequency, and a plurality of modal components of being continuous are selected for fusion to obtain fusion components under a corresponding fusion method, where a modal component number fused by different fusion methods is different.

In the system of the second aspect of the disclosure, each of the fusion components includes a set number of sub-fusion components, and the power grid frequency modulation response demand includes a set number of response demand values, in the selection module, calculating ratios of each of the fusion components to the power grid frequency modulation response demand includes: for each of the fusion components, corresponding fusion component average values are calculated based on a set number of sub-fusion components of the fusion component; a response demand average value is calculated based on a set number of response demand values of the power grid frequency modulation response demand; the ratios of each of the fusion component to the power grid frequency modulation response demand are calculated by using each of the fusion component average values and the response demand average value.

In order to achieve the above purpose, the third aspect embodiment of the disclosure provides an electronic device, which includes a processor and a memory in communication connection with the processor; the memory store computer execution instruction; the processor executes the computer execution instruction stored in the memory to realize the method provided in the first aspect of the disclosure.

In order to achieve the above purpose, the fourth aspect embodiment of the disclosure provides a computer-readable storage medium, in which computer execution instruction are stored, and the computer execution instruction, when executed by a processor, are used to realize the method provided in the first aspect of the disclosure.

In the frequency modulation method and system for a thermal power unit coupled with molten salt energy storage, the electronic device and the storage medium provided by the disclosure, the power grid frequency modulation response demand is determined based on received frequency modulation instruction; the power grid frequency modulation response demand is decomposed by VMD algorithm based on a decomposition layer number to obtain residual components and a plurality of modal components; adjacent aliasing degrees of all the modal components are calculated, and a high frequency modal component group and a low frequency modal component group are divided based on an adjacent aliasing degree minimum value; if the high frequency modal component group only includes one modal component, the residual components and the plurality of modal components are equally divided into a high frequency group and a low frequency group according to central frequencies, and a plurality of fusion methods are performed on modal components in the high frequency group to obtain different fused components; ratios of each of the fusion components to the power grid frequency modulation response demand are calculated, a target ratio group of being larger than a set ratio is screened from all the ratios, and fusion components corresponding to a minimum frequency division point are selected as target fusion components based on frequency division points of each of the fusion components corresponding to the target ratio group; where modal components in the high frequency group corresponding to the target fusion components constitute high frequency components, and the low frequency group and remaining modal components in the high frequency group constitute low frequency components; the molten salt energy storage device is controlled to respond according to the high frequency components and thermal power unit is controlled to respond according to the low frequency components. In this case, a high frequency modal component group and a low frequency modal component group are divided based on an adjacent aliasing degree minimum value, if the high frequency modal component group only includes one modal component, at this time, the low frequency modal component group includes the remaining modal components, corresponding to the low frequency modal component of thermal power unit will cause the unit to undertake too many tasks, which will increase the wear degree and affect the service life, therefore, the high-frequency group and the low-frequency group are re-obtained according to the central frequencies, and the modal components in the high frequency group are performed a plurality of fusion methods to obtain different fusion components. The ratios of each of the fusion components to the power grid frequency modulation response demand are calculated, a target ratio group of being larger than a set ratio is screened from all the ratios, and fusion components corresponding to a minimum frequency division point are selected as target fusion components based on frequency division points of each of the fusion components corresponding to the target ratio group; where modal components in the high frequency group corresponding to the target fusion components constitute high frequency components, and the low frequency group and remaining modal components in the high frequency group constitute low frequency components, where, the ratio of being greater than the set value can ensure that the molten salt energy storage device used to execute high-frequency components can occupy more tasks, and selecting the frequency division point minimum value of each of the fusion components corresponding to the target ratio group can ensure the minimum modal aliasing, thus reducing the modal aliasing and reducing the impact on the service life of the unit.

Additional aspect and advantages of the disclosure will be set forth in part in the following description, and in part will be obvious from the following description, or may be learned by practice of the disclosure.

BRIEF DESCRIPTION OF THE DRAWINGS

The above and/or additional aspects and advantages of the disclosure will be apparent and easily understood from the following description of embodiments taken in conjunction with the accompanying drawings, in which:

FIG. 4 is a block diagram of a frequency modulation system for a thermal power unit coupled with molten salt energy storage provided by the embodiment of the disclosure.

DETAILED DESCRIPTION OF THE EMBODIMENTS

Figure 1:
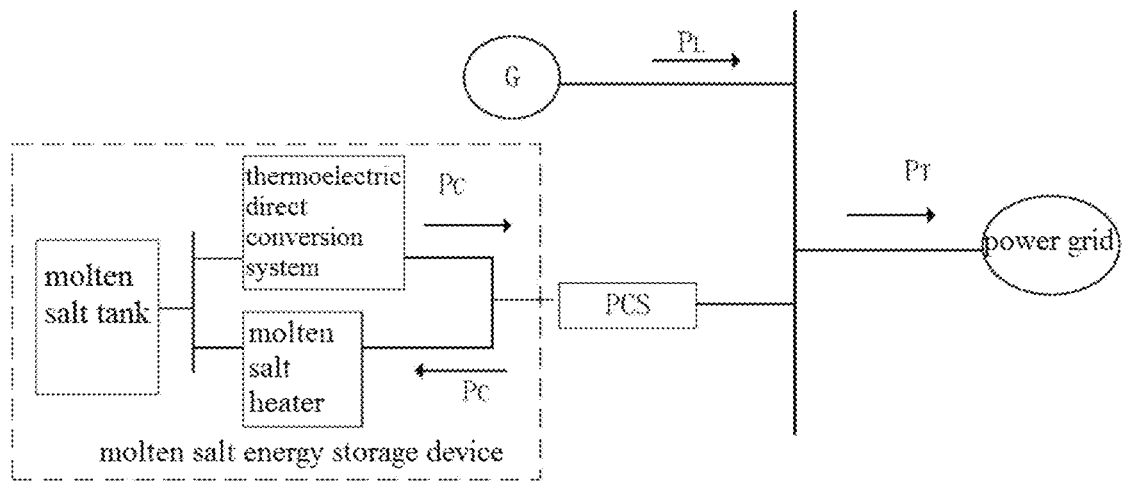
FIG. 1 is a schematic diagram of the connection between a thermal power plant and a power grid provided by the embodiment of the disclosure.

In the following, embodiments of the disclosure will be described in detail, examples of which are illustrated in the accompanying drawings, where the same or similar reference numerals indicate the same or similar elements or elements having the same or similar functions throughout. The embodiments described below by referring to the attached drawings are exemplary and are intended to explain the disclosure, but not to be construed as limitations of the disclosure.

In the following, the frequency modulation method and system for a thermal power unit coupled with molten salt energy storage according to the embodiment of the disclosure will be described with reference to the attached drawings.

The embodiment of the disclosure provides a frequency modulation method for a thermal power unit coupled with molten salt energy storage, so as to reduce the influence on the service life of the unit.

In the disclosure, thermal power plant is equipped with molten salt energy storage device, which assists thermal power unit to participate in frequency modulation.

FIG. 1 is a schematic diagram of the connection between thermal power plant and the power grid provided by an embodiment of the disclosure. As shown in FIG. 1, thermal power unit G is connected to the power grid through the bus, and the molten salt energy storage device (which can be simply referred to as molten salt or molten salt energy storage) is connected to the power grid through the bus. When the power grid sends the frequency modulation instruction, the frequency modulation instruction carries the power grid frequency modulation response demand $P_T$. After thermal power plant receives the frequency modulation instruction, thermal power unit G responds with thermal power unit load $P_L$, and the rest is responded by the molten salt energy storage device, that is, the molten salt energy storage device responds with the molten salt energy storage output of $P_C(P_T-P_L=P_C)$. By using the frequency modulation method for thermal power unit coupled with molten salt, the values of thermal power unit load $P_L$ and the molten salt energy storage output $P_C$ can be determined more accurately.

Figure 2:
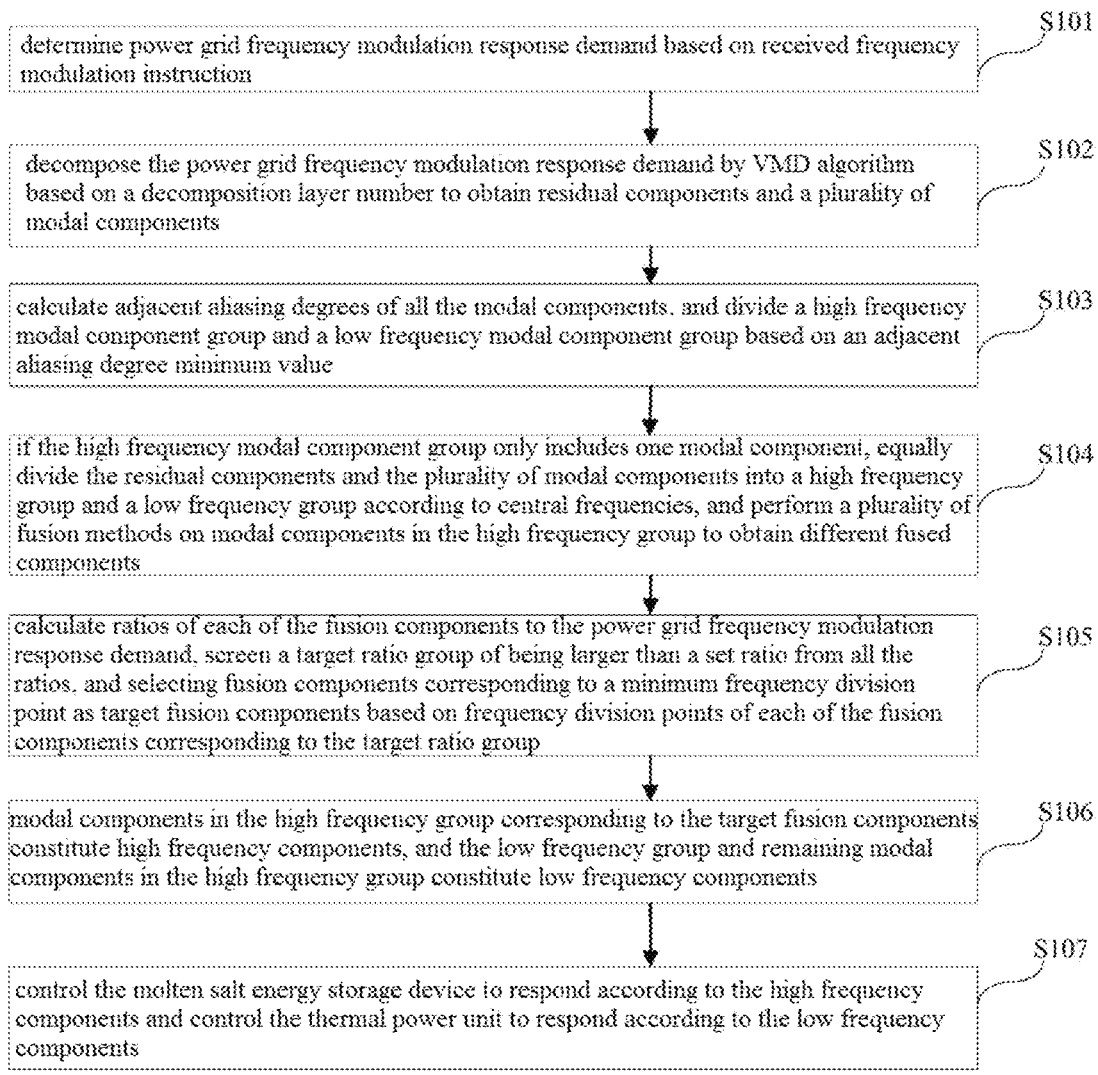
FIG. 2 is a schematic flow diagram of a frequency modulation method for a thermal power unit coupled with molten salt energy storage provided by the embodiment of the disclosure.
Figure 3:
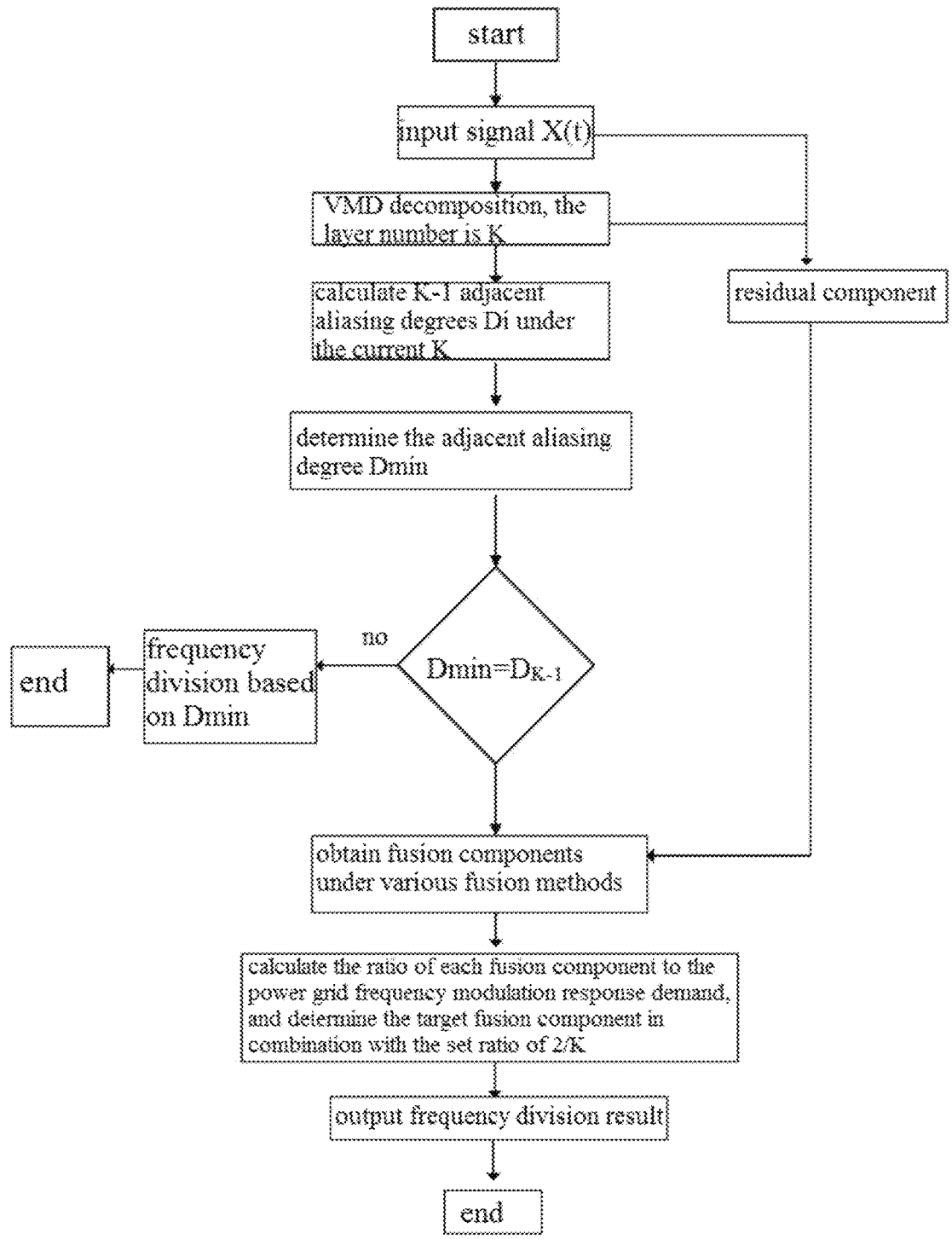
FIG. 3 is a schematic flow diagram of obtaining high and low frequency components provided by the embodiment of the disclosure.

FIG. 2 is a schematic flow diagram of the frequency modulation method for a thermal power unit coupled with molten salt energy storage provided by the embodiment of the disclosure. FIG. 3 is a schematic flow diagram of obtaining high and low frequency components provided by the embodiment of the disclosure.

As shown in FIG. 2, the frequency modulation method for a thermal power unit coupled with molten salt energy storage includes:

Step 101, the power grid frequency modulation response demand is determined based on received frequency modulation instruction.

Specifically, in step 101, the frequency modulation instruction carries the power grid frequency modulation response demand $P_T$, so the power grid frequency modulation response demand can be determined based on the received frequency modulation instruction.

In step 101, the power grid frequency modulation response demand is a discrete signal, and each discrete point (i.e., each sampling point) corresponds to a response demand value, and the power grid frequency modulation response demand includes a set number of response demand values. The set number can be represented by N.

Step 102, the power grid frequency modulation response demand is decomposed by VMD algorithm based on a decomposition layer number to obtain residual components and a plurality of modal components.

It is easy to understand that VMD (Variational Mode Decomposition) algorithm is a completely non-recursive modal variational method. By using VMD algorithm, the original signal f (t) can be decomposed into a plurality of intrinsic mode functions (IMF) with certain sparsity. The number of modal components obtained by decomposition is the decomposition layer number K, and a residual component is obtained by subtracting all modal components obtained by decomposition from the power grid frequency modulation response demand.

In step 102, since the power grid frequency modulation response demand includes a set number of response demand values, the power grid frequency modulation response demand is decomposed, that is, the response demand values of each sampling point are decomposed, each response demand value is decomposed into a plurality of sub-modal components, and the number of sub-modal components decomposed by each response demand value is equal to the decomposition layer number. Each modal component includes a set number of sub-modal components, which are obtained by decomposing the response demand values of the corresponding set number of sampling points.

Step 103, adjacent aliasing degrees of all the modal components are calculated, and a high frequency modal component group and a low frequency modal component group are divided based on an adjacent aliasing degree minimum value.

Specifically, in step 103, all modal components are arranged according to the central frequencies from small to large, K−1 adjacent aliasing degrees corresponding to K modal components are calculated, the adjacent aliasing degree minimum value and the adjacent modal components corresponding to the adjacent aliasing degree minimum value are determined, and the modal components with larger central frequency in the adjacent modal components corresponding to the adjacent aliasing degree minimum value and other modal components with larger central frequency and other modal components of central frequency being larger than larger central frequency of the adjacent modal components are divided into the high frequency modal component group, the remaining modal components and residual components except the modal components of the high frequency modal component group are divided into the low frequency modal component group.

In step 103, the adjacent aliasing degree satisfies:

$$D_i = \left| \frac{\omega_{(i+1)-(i)}}{\omega_{(i+1)max} - \omega_{(i)min}} \right|;$$

Where, $D_i$ is the adjacent aliasing degree between the i+1-th modal component and the i-th modal component, $\omega_{(i+1)-(i)}$ represents the frequency overlapping interval (i.e. crossing interval) of adjacent modal components, $\omega_{(i+1)max}-$ $\omega_{(i)min}$ represents the frequency interval of adjacent modal components, and $\omega_{(i+1)max}$ is the frequency maximum value of the latter one (i.e. the i+1-th modal component) among the adjacent modal components. $\omega_{(i)min}$ is the frequency minimum value of the previous one (i.e. the i-th modal component) among the adjacent modal components. i takes 1 to k−1. That is, K−1 adjacent aliasing degree is calculated based on K modal components.

Step 104, if the high frequency modal component group only includes one modal component, the residual components and the plurality of modal components are equally divided into a high frequency group and a low frequency group according to central frequencies, and a plurality of fusion methods are performed on modal components in the high frequency group to obtain different fused components.

In step 104, if the adjacent aliasing degree minimum value Dmin is equal to $D_{K-1}$, where the adjacent modal components corresponding to $D_{K-1}$ are the K−1-th modal component and the K-th modal component, the K-th modal component is the modal component with the largest central frequency, the high frequency modal component group only includes one modal component at this time. At this time, the low frequency modal component group includes K−1 modal components and residual components. At this time, the low frequency modal component group includes the remaining modal components. Corresponding to the low frequency modal components of thermal power unit will cause the unit to undertake too many tasks, which will increase the wear degree and affect the service life. Therefore, in order to make the molten salt energy storage device undertake more tasks, it is necessary to re-divide the residual components and multiple modal components.

In step 104, when re-dividing, the modal components are arranged according to the central frequency from small to large, and the residual component and a plurality of modal components are equally divided into a high frequency group and a low frequency group.

Specifically, equally dividing the residual components and the plurality of modal components into a high frequency group and a low frequency group includes: if a component total number of the residual component and the plurality of modal components is even, a modal component number of the high frequency group is equal to half of the component total number; if the component total number of the residual components and the plurality of modal components is odd, the modal component number of the high frequency group is equal to half of the component total number and then rounded up. In step 104, performing a plurality of fusion methods on modal components in the high frequency group to obtain different fused components includes: the modal components in the high frequency group are arranged according to the central frequencies from small to large; each of the fusion methods is started with modal components corresponding to a maximum central frequency, and a plurality of modal components of being continuous are selected for fusion to obtain fusion components under a corresponding fusion method, where a modal component number fused by different fusion methods is different, Taking K=9 and the number of modal components in the high frequency group is equal to 5 as an example, four fusion methods are determined. The four fusion methods are: starting from the modal component corresponding to the maximum central frequency is performed, two consecutive modal components (i.e. the K-th and K−1-th modal components), three consecutive modal components (i.e. the K-th, K−1-th and K−2-th modal components), four consecutive modal components (i.e. the K-th, K−1-th, K−2-th and K−3- th modal components) and five consecutive modal components (i.e. the K-th, K-1-th, K-2-th, K-3-th and K-4-th modal components) are selected for fusion to obtain four fusion components in the corresponding fusion mode. Because each modal component includes a set number of sub-modal components, each fusion component includes a set number of sub-fusion components, and each sub-fusion component is equal to the sum of all sub-modal components corresponding to the same sampling point in the corresponding fusion mode.

In step 104, if the high frequency modal component group includes more than one modal component, the high frequency modal component group is directly regarded as the high frequency component and the low frequency modal component group is regarded as the low frequency component.

Step 105: ratios of each of the fusion components to the power grid frequency modulation response demand are calculated, a target ratio group of being larger than a set ratio is screened from all the ratios, and fusion components corresponding to a minimum frequency division point are selected as target fusion components based on frequency division points of each of the fusion components corresponding to the target ratio group.

Specifically, in step 105, calculating ratios of each of the fusion components to the power grid frequency modulation response demand includes: for each of the fusion components, corresponding fusion component average values are calculated based on a set number of sub-fusion components of the fusion component; a response demand average value is calculated based on a set number of response demand values of the power grid frequency modulation response demand.

Where, the average value of each fusion component is equal to the sum of the set number of sub-fusion components corresponding to the fusion component divided by the set number. The response demand average value is equal to the sum of the set number of response demand values divided by the set number. The ratio of each fusion component to the power grid frequency modulation response demand is obtained, that is, each fusion component corresponds to a ratio.

In step 105, a target ratio group larger than a set ratio (the set ratio is, for example, 2/K) is screened from all ratios, that is, the ratios larger than the set ratio are screened from all ratios, and these ratios are used as target ratios to participate in the subsequent processing. All target ratios form a target ratio group.

In step 105, based on the frequency division points of each fusion component corresponding to the target ratio group, the fusion component corresponding to the minimum frequency division point is selected as the target fusion component. Specifically, the frequency division point of each fusion component is the adjacent aliasing degree between the modal component with the smallest central frequency and its previous adjacent modal component among the modal components that make up the fusion component. For example, the ratio of the fusion component after the fusion of 3 consecutive modal components (i.e. the K-th, K-1-th and K-2-th modal components) is greater than the set ratio, which is the target ratio. At this time, the frequency division point of the fusion component is the adjacent aliasing degree of the K-2 modal component and the K-3 modal component, that is, the frequency division point of the fusion component can be expressed as DK-3.

In step 105, the minimum frequency division point is selected from the frequency division points of fusion components corresponding to all target ratios in the target ratio group, and the fusion component corresponding to the minimum frequency division point is the target fusion component.

Step 106, modal components in the high frequency group corresponding to the target fusion components constitute high frequency components, and the low frequency group and remaining modal components in the high frequency group constitute low frequency components.

In step 106, for example, the frequency division point DK-3 of the fusion component after the fusion of 3 consecutive modal components (i.e., the K-th, K-1-th and K-2-th modal components) is the minimum value of the frequency division points of the fusion components corresponding to all target ratios, and at this time, the K-th, K-1-th and K-2-th modal components constitute high-frequency components. Low frequency components include residual components and 1-th to K-3-th modal components.

Step 107, the molten salt energy storage device is controlled to respond according to the high frequency components and thermal power unit is controlled to respond according to the low frequency components.

In some embodiments, as shown in FIG. 2, the specific process of obtaining high and low frequency components includes:

After the input signal (i.e. power grid frequency modulation response demand), the power grid frequency modulation response demand is decomposed by VMD algorithm based on the decomposition layer number K to obtain residual components and K modal components, K-1 adjacent aliasing degrees Di corresponding to the K modal components are calculated, the adjacent aliasing degrees minimum value Dmin is determined, and whether it is true that Dmin is equal to $D_{K-1}$ is judged. If not, the frequency is divided according to Dmin (i.e. the high frequency modal component group is directly taken as the high frequency component, low frequency modal component group is used as low frequency component), if so, it is re-divided to obtain fusion components in various fusion methods, the ratio of each fusion component to the power grid frequency modulation response demand is calculated, the target ratio group larger than a set ratio of 2/K is screened from all the ratios, and the fusion component corresponding to the minimum frequency division point is selected as the target fusion component based on the frequency division point of each fusion component corresponding to the target ratio group, and the distribution result is output (that is, the modal components in the high frequency group corresponding to the target fusion component constitute high-frequency components, and the low frequency group and remaining modal components in the high frequency group constitute low frequency components).

In order to verify the effect of the method in the disclosure, experimental verification is carried out.

In order to further verify the advantages of the algorithm provided by the disclosure, the frequency modulation instruction is decomposed by the algorithm of the disclosure and the traditional prediction method respectively, and the results (wear degree of thermal power unit) under the condition that the aliasing degree is just at the end are shown in Table 1.

TABLE 1

Table of wear degree of adjacent modes

| instruction signal/ decomposition layer number K | the traditional method | the disclosure |
|---|---|---|
| signal 1/K = 11 | 5.5 | 5.1 |
| signal 2/K = 8 | 5.3 | 5.2 |
| signal 3/K = 7 | 5.4 | 5.2 |
| signal 4/K = 8 | 5.9 | 5.6 |
| signal 5/K = 9 | 5.1 | 5.0 |
| signal 6/K = 10 | 6.1 | 5.8 |
| signal 7/K = 11 | 5.0 | 4.9 |
| signal 8/K = 12 | 7.1 | 6.9 |

As can be seen from Table 1, the algorithm provided by the disclosure is superior to the traditional decomposition method from the comprehensive point of view (stability and aliasing degree).

In order to realize the above embodiment, the disclosure also provides a frequency modulation system for a thermal power unit coupled with molten salt energy storage, and thermal power plant is equipped with molten salt energy storage device.

FIG. 4 is a block diagram of a frequency modulation system for a thermal power unit coupled with molten salt energy storage provided by the embodiment of the disclosure.

As shown in FIG. 4, the frequency modulation system for a thermal power unit coupled with molten salt energy storage includes an obtaining module 11, a decomposition module 12, a calculation module 13, a fusion module 14, a selection module 15, a dividing module 16 and a control module 17, where:

the obtaining module 11, used for determining power grid frequency modulation response demand based on received frequency modulation instruction;

the decomposition module 12, used for decomposing the power grid frequency modulation response demand by VMD algorithm based on a decomposition layer number to obtain residual components and a plurality of modal components;

the calculation module 13, used for calculating adjacent aliasing degrees of all the modal components, and dividing a high frequency modal component group and a low frequency modal component group based on an adjacent aliasing degree minimum value;

the fusion module 14, used for equally dividing the residual components and the plurality of modal components into a high frequency group and a low frequency group according to central frequencies if the high frequency modal component group only includes one modal component, and performing a plurality of fusion methods on modal components in the high frequency group to obtain different fused components;

the selection module 15, used for calculating ratios of each of the fusion components to the power grid frequency modulation response demand, screening a target ratio group of being larger than a set ratio from all the ratios, and selecting fusion components corresponding to a minimum frequency division point as target fusion components based on frequency division points of each of the fusion components corresponding to the target ratio group;

the dividing module 16, used for constituting high frequency components from modal components in the high frequency group corresponding to the target fusion components, constituting low frequency components from the low frequency group and remaining modal components in the high frequency group;

the control module 16, used for controlling the molten salt energy storage device to respond according to the high frequency components and controlling thermal power unit to respond according to the low frequency components.

Further, in one possible implementation of the embodiment of the disclosure, in the fusion module 14, equally dividing the residual components and the plurality of modal components into a high frequency group and a low frequency group includes: if a component total number of the residual component and the plurality of modal components is even, a modal component number of the high frequency group is equal to half of the component total number; if the component total number of the residual components and the plurality of modal components is odd, the modal component number of the high frequency group is equal to half of the component total number and then rounded up.

Further, in one possible implementation of the embodiment of the disclosure, in the fusion module 14, performing a plurality of fusion methods on modal components in the high frequency group to obtain different fused components includes: the modal components in the high frequency group are arranged according to the central frequencies from small to large; each of the fusion methods is started with modal components corresponding to a maximum central frequency, and a plurality of modal components of being continuous are selected for fusion to obtain fusion components under a corresponding fusion method, where a modal component number fused by different fusion methods is different.

Further, in one possible implementation of the embodiment of the disclosure, each of the fusion components includes a set number of sub-fusion components, and the power grid frequency modulation response demand includes a set number of response demand values, in the selection module 15, calculating ratios of each of the fusion components to the power grid frequency modulation response demand includes: for each of the fusion components, corresponding fusion component average values are calculated based on a set number of sub-fusion components of the fusion component; a response demand average value is calculated based on a set number of response demand values of the power grid frequency modulation response demand; the ratios of each of the fusion component to the power grid frequency modulation response demand are calculated by using each of the fusion component average values and the response demand average value.

It should be noted that the above explanation of the frequency modulation method embodiment for a thermal power unit coupled with molten salt energy storage is also applicable to the frequency modulation system embodiment for a thermal power unit coupled with molten salt energy storage, and will not be repeated here.

In the embodiment of the disclosure, the power grid frequency modulation response demand is determined based on received frequency modulation instruction; the power grid frequency modulation response demand is decomposed by VMD algorithm based on the decomposition layer number to obtain residual components and a plurality of modal components; adjacent aliasing degrees of all the modal components are calculated, and a high frequency modal component group and a low frequency modal component group are divided based on an adjacent aliasing degree minimum value; if the high frequency modal component group only includes one modal component, the residual components and the plurality of modal components are equally divided into a high frequency group and a low frequency group according to central frequencies, and a plurality of fusion methods are performed on modal components in the high frequency group to obtain different fused components; ratios of each of the fusion components to the power grid frequency modulation response demand are calculated, a target ratio group of being larger than a set ratio is screened from all the ratios, and fusion components corresponding to a minimum frequency division point are selected as target fusion components based on frequency division points of each of the fusion components corresponding to the target ratio group; where modal components in the high frequency group corresponding to the target fusion components constitute high frequency components, and the low frequency group and remaining modal components in the high frequency group constitute low frequency components; the molten salt energy storage device is controlled to respond according to the high frequency components and thermal power unit is controlled to respond according to the low frequency components. In this case, a high frequency modal component group and a low frequency modal component group are divided based on an adjacent aliasing degree minimum value, if the high frequency modal component group only includes one modal component, at this time, the low frequency modal component group includes the remaining modal components, corresponding to the low frequency modal component of thermal power unit will cause the unit to undertake too many tasks, which will increase the wear degree and affect the service life, therefore, the high-frequency group and the low-frequency group are re-obtained according to the central frequencies, and the modal components in the high frequency group are performed a plurality of fusion methods to obtain different fusion components. The ratios of each of the fusion components to the power grid frequency modulation response demand are calculated, a target ratio group of being larger than a set ratio is screened from all the ratios, and fusion components corresponding to a minimum frequency division point are selected as target fusion components based on frequency division points of each of the fusion components corresponding to the target ratio group; where modal components in the high frequency group corresponding to the target fusion components constitute high frequency components, and the low frequency group and remaining modal components in the high frequency group constitute low frequency components, where, the ratio of being greater than the set value can ensure that the molten salt energy storage device used to execute high-frequency components can occupy more tasks, and selecting the frequency division point minimum value of each of the fusion components corresponding to the target ratio group can ensure the minimum modal aliasing, thus reducing the modal aliasing and reducing the impact on the service life of the unit.

In order to realize the above embodiment, the disclosure also provides an electronic device, which includes a processor and a memory in communication connection with the processor; the memory store computer execution instruction; the processor executes the computer execution instruction stored in the memory, so as to realize the execution of the method provided by the aforementioned embodiment.

In order to realize the above embodiments, the disclosure also provides a computer-readable storage medium, in which computer execution instructions are stored, and the computer execution instructions, when executed by a processor, are used to realize the methods provided in the aforementioned embodiments.

In order to realize the above embodiments, the disclosure also provides a computer program product including a computer program. The computer program, when executed by a processor, realizes the methods provided by the aforementioned embodiments.

In the description of the aforementioned embodiments, reference terms "one embodiment", "some embodiments", "examples", "specific examples" or "some examples" mean that the specific features, structures, materials or characteristics described in connection with the embodiment or example are included in at least one embodiment or example of the disclosure. In this description, the schematic expressions of the above terms are not necessarily aimed at the same embodiment or example. Moreover, the specific features, structures, materials or characteristics described may be combined in any one or more embodiments or examples in a suitable manner. In addition, those skilled in the art can combine and assembly different embodiments or examples and features of different embodiments or examples described in this description without contradicting each other.

In addition, the terms "first" and "second" are only used for descriptive purposes, and cannot be understood as indicating or implying relative importance or implicitly indicating the number of indicated technical features. Therefore, the features defined as "first" and "second" can explicitly or implicitly include at least one of these features. In the description of this disclosure, "multiple" means at least two, such as two, three, etc., unless otherwise specifically defined.

Any process or method description in the flowchart or otherwise described herein can be understood as representing a module, segment or part of code that includes one or more executable instructions for implementing customized logic functions or steps of the process, and the scope of preferred embodiments of the disclosure includes other implementations, in which functions can be performed out of the order shown or discussed, including in a substantially simultaneous manner or in the reverse order according to the functions involved, which should be understood by those skilled in the technical field to which embodiments of the disclosure belong.

The logic and/or steps represented in the flowchart or described in other ways herein, for example, can be regarded as a sequenced list of executable instructions for realizing logical functions, and can be embodied in any computer-readable medium for use by or in combination with an instruction execution system, apparatus or device (such as a computer-based system, a system including a processor or other systems that can fetch instructions from and execute instructions from the instruction execution system, apparatus or device). For the purposes of this description, a "computer-readable medium" can be any device that can contain, store, communicate, propagate or transmit a program for use by or in connection with an instruction execution system, apparatus or device. More specific examples (non-exhaustive list) of computer-readable medium include the following: an electrical connection part (electronic device) with one or more wires, a portable computer disk box (magnetic device), a random access memory (RAM), a read-only memory (ROM), an erasable and editable read-only memory (EPROM or flash memory), an optical fiber device, and a portable read-only memory (CD-ROM). In addition, the computer-readable medium may even be paper or other suitable medium on which the program can be printed, because the program can be obtained electronically, for example, by optically scanning paper or other medium, followed by editing, interpreting or processing in other suitable ways if necessary, and then stored in a computer memory.

It should be understood that various parts of the disclosure can be implemented in hardware, software, firmware or a combination thereof. In the above embodiments, a plurality of steps or methods can be realized by software or firmware stored in a memory and executed by an appropriate instruction execution system. For example, if it is implemented by hardware, as in another embodiment, it can be implemented by any one of the following technologies known in the art or their combination: discrete logic circuits with logic gate circuit for implementing logic functions on data signals, application specific integrated circuits with appropriate combinational logic gate circuits, programmable gate arrays (PGA), field programmable gate arrays (FPGA), etc.

Those skilled in the art can understand that all or part of the steps carried by the method of the above embodiment can be completed by instructing related hardware through a program, which can be stored in a computer-readable storage medium. When the program is executed, it includes one or a combination of the steps of the method embodiment.

In addition, each functional unit in each embodiment of the disclosure can be integrated in one processing module, or each unit can exist physically alone, or two or more units can be integrated in one module. The above integrated modules can be realized in the form of hardware or software functional modules. The integrated module can also be stored in a computer-readable storage medium if it is implemented in the form of a software functional module and sold or used as an independent product.

The storage medium mentioned above can be read-only memory, magnetic disk or optical disk, etc. Although the embodiments of the disclosure have been shown and described above, it can be understood that the above embodiments are exemplary and cannot be understood as limitations of the disclosure, and those skilled in the art can make changes, modifications, substitutions and variations to the above embodiments within the scope of the disclosure.

What is claimed is:

1. A frequency modulation method for a thermal power unit coupled with molten salt energy storage, wherein a thermal power plant is equipped with a molten salt energy storage device, and the frequency modulation method comprises:
    determining power grid frequency modulation response demand based on received frequency modulation instruction;
    decomposing the power grid frequency modulation response demand by VMD algorithm based on a decomposition layer number to obtain residual components and a plurality of modal components;
    calculating adjacent aliasing degrees of all the modal components, and dividing a high frequency modal component group and a low frequency modal component group based on an adjacent aliasing degree minimum value;
    if the high frequency modal component group only comprises one modal component, equally dividing the residual components and the plurality of modal components into a high frequency group and a low frequency group according to central frequencies, and performing a plurality of fusion methods on modal components in the high frequency group to obtain different fused components;
    calculating ratios of each of the fusion components to the power grid frequency modulation response demand, screening a target ratio group of being larger than a set ratio from all the ratios, and selecting fusion components corresponding to a minimum frequency division point as target fusion components based on frequency division points of each of the fusion components corresponding to the target ratio group;
    wherein modal components in the high frequency group corresponding to the target fusion components constitute high frequency components, and the low frequency group and remaining modal components in the high frequency group constitute low frequency components;
    controlling the molten salt energy storage device to respond according to the high frequency components and controlling thermal power unit to respond according to the low frequency components.

2. The frequency modulation method for a thermal power unit coupled with molten salt energy storage according to claim 1, wherein equally dividing the residual components and the plurality of modal components into a high frequency group and a low frequency group comprises: if a component total number of the residual component and the plurality of modal components is even, a modal component number of the high frequency group is equal to half of the component total number; if the component total number of the residual components and the plurality of modal components is odd, the modal component number of the high frequency group is equal to half of the component total number and then rounded up.

3. The frequency modulation method for a thermal power unit coupled with molten salt energy storage according to claim 2, wherein performing a plurality of fusion methods on modal components in the high frequency group to obtain different fused components comprises:
    arranging the modal components in the high frequency group according to the central frequencies from small to large;
    starting each of the fusion methods with modal components corresponding to a maximum central frequency, and selecting a plurality of modal components of being continuous for fusion to obtain fusion components under a corresponding fusion method, wherein a modal component number fused by different fusion methods is different.

4. The frequency modulation method for a thermal power unit coupled with molten salt energy storage according to claim 3, wherein each of the fusion components comprises a set number of sub-fusion components, and the power grid frequency modulation response demand comprises a set number of response demand values, calculating ratios of each of the fusion components to the power grid frequency modulation response demand comprises:
    for each of the fusion components, calculating corresponding fusion component average values based on a set number of sub-fusion components of the fusion component;
    calculating a response demand average value based on a set number of response demand values of the power grid frequency modulation response demand;
    calculating the ratios of each of the fusion component to the power grid frequency modulation response demand by using each of the fusion component average values and the response demand average value.

5. A frequency modulation system for a thermal power unit coupled with molten salt energy storage, wherein a thermal power plant is equipped with a molten salt energy storage device, and the frequency modulation system comprises:

an obtaining module, used for determining power grid frequency modulation response demand based on received frequency modulation instruction;

a decomposition module, used for decomposing the power grid frequency modulation response demand by VMD algorithm based on a decomposition layer number to obtain residual components and a plurality of modal components;

a calculation module, used for calculating adjacent aliasing degrees of all the modal components, and dividing a high frequency modal component group and a low frequency modal component group based on an adjacent aliasing degree minimum value;

a fusion module, used for equally dividing the residual components and the plurality of modal components into a high frequency group and a low frequency group according to central frequencies if the high frequency modal component group only comprises one modal component, and performing a plurality of fusion methods on modal components in the high frequency group to obtain different fused components;

a selection module, used for calculating ratios of each of the fusion components to the power grid frequency modulation response demand, screening a target ratio group of being larger than a set ratio from all the ratios, and selecting fusion components corresponding to a minimum frequency division point as target fusion components based on frequency division points of each of the fusion components corresponding to the target ratio group;

a dividing module, used for constituting high frequency components from modal components in the high frequency group corresponding to the target fusion components, constituting low frequency components from the low frequency group and remaining modal components in the high frequency group;

a control module, used for controlling the molten salt energy storage device to respond according to the high frequency components and controlling thermal power unit to respond according to the low frequency components.

6. The frequency modulation system for a thermal power unit coupled with molten salt energy storage according to claim 5, wherein in the fusion module, equally dividing the residual components and the plurality of modal components into a high frequency group and a low frequency group comprises: if a component total number of the residual component and the plurality of modal components is even, a modal component number of the high frequency group is equal to half of the component total number; if the component total number of the residual components and the plurality of modal components is odd, the modal component number of the high frequency group is equal to half of the component total number and then rounded up.

7. The frequency modulation system for a thermal power unit coupled with molten salt energy storage according to claim 6, wherein in the fusion module, performing a plurality of fusion methods on modal components in the high frequency group to obtain different fused components comprises: the modal components in the high frequency group are arranged according to the central frequencies from small to large; each of the fusion methods is started with modal components corresponding to a maximum central frequency, and a plurality of modal components of being continuous are selected for fusion to obtain fusion components under a corresponding fusion method, wherein a modal component number fused by different fusion methods is different.

8. The frequency modulation system for a thermal power unit coupled with molten salt energy storage according to claim 7, wherein each of the fusion components comprises a set number of sub-fusion components, and the power grid frequency modulation response demand comprises a set number of response demand values, in the selection module, calculating ratios of each of the fusion components to the power grid frequency modulation response demand comprises: for each of the fusion components, corresponding fusion component average values are calculated based on a set number of sub-fusion components of the fusion component; a response demand average value is calculated based on a set number of response demand values of the power grid frequency modulation response demand; the ratios of each of the fusion component to the power grid frequency modulation response demand are calculated by using each of the fusion component average values and the response demand average value.

9. An electronic device, comprising: a processor and a memory in communication connection with the processor; wherein the memory stores computer execution instruction;

the processor executes the computer execution instruction stored in the memory to realize a frequency modulation method for a thermal power unit coupled with molten salt energy storage, wherein a thermal power plant is equipped with a molten salt energy storage device, and the frequency modulation method comprises:

determining power grid frequency modulation response demand based on received frequency modulation instruction;

decomposing the power grid frequency modulation response demand by VMD algorithm based on a decomposition layer number to obtain residual components and a plurality of modal components;

calculating adjacent aliasing degrees of all the modal components, and dividing a high frequency modal component group and a low frequency modal component group based on an adjacent aliasing degree minimum value;

if the high frequency modal component group only comprises one modal component, equally dividing the residual components and the plurality of modal components into a high frequency group and a low frequency group according to central frequencies, and performing a plurality of fusion methods on modal components in the high frequency group to obtain different fused components;

calculating ratios of each of the fusion components to the power grid frequency modulation response demand, screening a target ratio group of being larger than a set ratio from all the ratios, and selecting fusion components corresponding to a minimum frequency division point as target fusion components based on frequency division points of each of the fusion components corresponding to the target ratio group;

wherein modal components in the high frequency group corresponding to the target fusion components constitute high frequency components, and the low frequency group and remaining modal components in the high frequency group constitute low frequency components;

controlling the molten salt energy storage device to respond according to the high frequency components and controlling thermal power unit to respond according to the low frequency components.

* * * * *